United States Patent
Petri et al.

(10) Patent No.: US 10,393,280 B2
(45) Date of Patent: Aug. 27, 2019

(54) SEAT VALVE WITH ELECTROMAGNETIC ACTUATION

(71) Applicant: Thomas Magnete GmbH, Herdorf (DE)

(72) Inventors: Wolfgang Petri, Neunkirchen (DE); Thomas Lütz, Siegen (DE); Stefan Pilz, Neunkirchen (DE)

(73) Assignee: Thomas Magnete GmbH, Herdorf (DE)

( * ) Notice: Subject to any disclaimer, the term of this patent is extended or adjusted under 35 U.S.C. 154(b) by 0 days.

(21) Appl. No.: 15/700,596

(22) Filed: Sep. 11, 2017

(65) Prior Publication Data

US 2018/0073649 A1  Mar. 15, 2018

(30) Foreign Application Priority Data

Sep. 12, 2016 (DE) .................... 10 2016 011 058

(51) Int. Cl.
*F16K 15/18* (2006.01)
*F16K 17/06* (2006.01)
(Continued)

(52) U.S. Cl.
CPC .......... *F16K 15/186* (2013.01); *F16K 11/048* (2013.01); *F16K 17/06* (2013.01); *F16K 31/0634* (2013.01)

(58) Field of Classification Search
CPC ........ F16K 17/06; F16K 15/18; F16K 15/186; F16K 31/0634; F16K 31/02; F16K 31/04
See application file for complete search history.

(56) References Cited

U.S. PATENT DOCUMENTS 3,294,120 A  12/1966  Ruchser
6,131,606 A * 10/2000  O'Neill .............. F15B 11/028
                                           137/495
(Continued)

FOREIGN PATENT DOCUMENTS

CH   448655 A   12/1967
DE   2951462 A1   7/1980
(Continued)

OTHER PUBLICATIONS

German Office Action dated Aug. 7, 2017 in corresponding/related German Application No. 10 2016 011 058.9.

*Primary Examiner* — Kevin L Lee
(74) *Attorney, Agent, or Firm* — Harness, Dickey & Pierce, P.L.C.

(57) ABSTRACT

A seat valve with electromagnetic actuation combines, in one device, the functions of a seat valve, of a pressure-limiting valve and optionally also of one or more check valves. Furthermore, the switching noise of the seat valve function is reduced. In a de-energized state of an electromagnet, a fluid flow from a port P to a port TNC occurs only if a pressure difference between the ports P and TNC exceeds a limit value of $\Delta p_G$, wherein the force of the specified pressure difference overcomes the force of a spring and therefore pushes a first sealing body out of a first sealing seat, and in the energized state of the electromagnet, a fluid flow from port P to port TNC occurs even in the case of a pressure difference less than $\Delta p_G$ if the force of the electromagnet together with the force of the pressure difference between the ports P and TNC overcomes the force of the spring, wherein the sum of the specified forces pushes the first sealing body out of the first sealing seat. The seat valve may be used in hydraulic brake systems of vehicles, also in vehicle gear mechanisms or in hydraulic drives.

7 Claims, 1 Drawing Sheet

(51) Int. Cl.
*F16K 11/048* (2006.01)
*F16K 31/06* (2006.01)

(56) References Cited

U.S. PATENT DOCUMENTS

| | | |
|---|---|---|
| 8,960,639 B2 | 2/2015 | Hilzendegen et al. |
| 2015/0260302 A1* | 9/2015 | Peterson et al. .... F16K 31/0613 251/129.15 |

FOREIGN PATENT DOCUMENTS

| | | |
|---|---|---|
| DE | 19753575 A1 | 6/1999 |
| DE | 102012106684 A1 | 1/2014 |
| DE | 102014217447 A1 | 3/2016 |
| EP | 2491231 B1 | 8/2014 |

\* cited by examiner

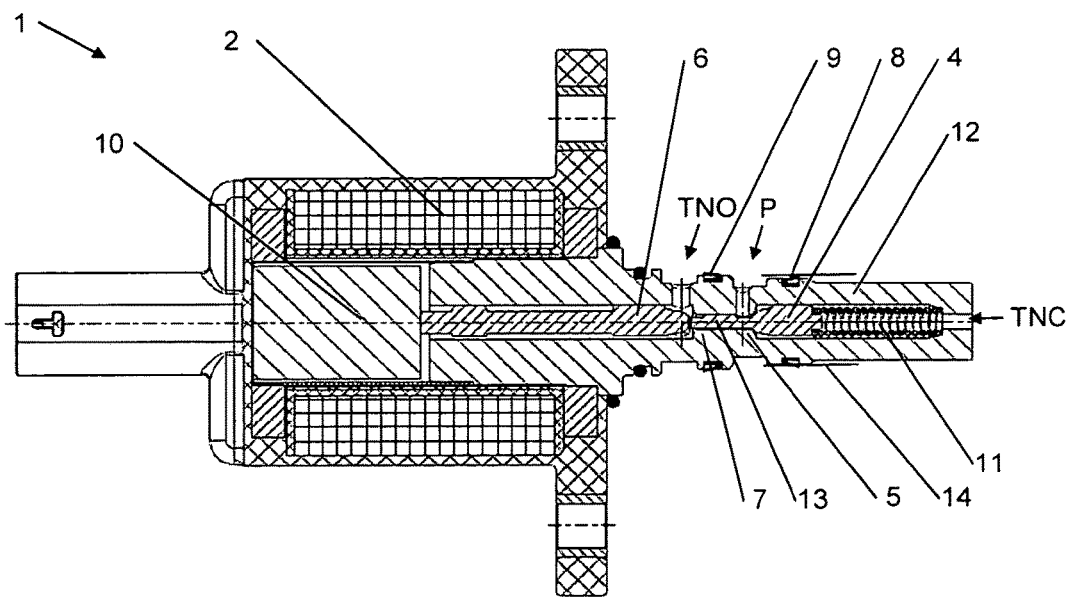

SEAT VALVE WITH ELECTROMAGNETIC ACTUATION

CROSS-REFERENCE TO RELATED APPLICATIONS

This application claims benefit of German Application No. 10 2016 011058.9 filed on Sep. 12, 2016. The entire disclosure of the above application is incorporated herein by reference.

FIELD OF THE INVENTION

The present disclosure relates to an electromagnetically actuated seat valve.

BACKGROUND OF THE INVENTION

This section provides background information related to the present disclosure which is not necessarily prior art.

Seat valves are known, and also seat valves with electromagnetic actuation are widespread. They serve for connecting and interrupting fluid flows in dependence on electrical signals. By contrast to slide valves, they offer better sealing in the interrupted state.

Likewise known and widespread are pressure-limiting valves which, when a predefined pressure difference between the pressures of the inlet and of the outlet is exceeded, permit a fluid flow from the inlet to the outlet, but interrupt this fluid flow if the specified pressure difference is not reached.

Also known are seals which, apart from their sealing function, are also able to carry out a function as a check valve if for example replenishment by suction is to be performed, for example in the case of air pumps and brake cylinders.

If several of the specified functions are required, it is generally necessary to use multiple devices which then have to be connected to tube lines.

BRIEF SUMMARY OF THE INVENTION

This section provides a general summary of the disclosure, and is not a comprehensive disclosure of its full scope or all of its features.

An object is to combine, in one device, the functions of the seat valve, of the pressure-limiting valve and optionally also of one or more check valves. Furthermore, the switching noise of the seat valve function is to be reduced.

The seat valve is actuated by an electromagnet which in a known way moves a sealing body and in the process pushes said sealing body into a sealing seat or out of a sealing seat. Here, the electromagnet acts against a spring.

The function of the pressure-limiting valve is fulfilled in that the specified spring pushes a first sealing body into the sealing seat assigned to said body as long as the force of the pressure difference prevailing for this valve function does not exceed the force of the spring, and permits the sealing body to be lifted off out of the sealing seat if the force of the pressure difference exceeds the force of the spring.

The specified pressure difference exists between the fluid at a port P and the fluid at a port TNC, wherein the port P is arranged on the sealing-body side and the port TNC is arranged on the sealing-seat side.

Here, the force of the pressure difference results from the product of the pressure difference and the effective surface area of the sealing body in its sealing seat.

In order that the pressure-limiting-valve function can be fulfilled independently of the switching function of the seat valve, the armature of the electromagnet is not permanently connected to the specified first sealing body, but it pushes onto the sealing body by means of a tappet, and the tappet can lift off from the sealing body.

In a further refinement, the seat valve has a further port TNO which, in the de-energized state of the electromagnet, is fluidically connected to the port P.

The armature of the electromagnet acts on a second sealing body which is arranged on the armature side of the first sealing body. When the armature is positioned in the rest position, said second sealing body is not situated in its assigned second sealing seat but, owing to the distance from the sealing seat, opens up a fluid flow from the port P to a further port TNO.

If the electromagnet is energized by an electrical controller which is able to generate currents of different strength, it is also possible to generate forces of different magnitude with the electromagnet. This is used advantageously in order to generate a partial stroke counter to the specified spring, in the case of which partial stroke the first sealing body is lifted off from its sealing seat, but the second sealing body does not yet reach its sealing seat.

The reduction of the switching noise is achieved by way of two measures which advantageously complement one another:

Firstly, the sealing body of the seat valve is produced from a plastic which has a considerably lower modulus of elasticity and considerably higher damping than the types of metal suitable for this purpose. Consequently, less structure-borne sound is introduced into the steel components of the seat valve.

Secondly, the construction of the seat valve has the effect that the structure-borne sound has to overcome two boundaries between materials having very different moduli of elasticity on the path to the further components outside the seat valve and is significantly damped during each boundary crossover. This is achieved in that the injection-moulded encapsulation and the fastening flange of the seat valve are produced from a thermoplastic, so that the structure-borne sound firstly passes over from the valve sleeve and other components composed of steel to the thermoplastic of the flange, and from there passes over to the fastening surface for the seat valve.

The material for the sealing body has to be highly wear- and temperature-resistant, and thus only a small number of plastic materials are suitable. It has been possible to determine by way of tests and from the literature that the materials PEEK: polyetheretherketone
PEI: polyetherimide
PESU: polyethersulfone
LCP: liquid crystal polymer are suitable for this application. The selection between said materials is advantageously made according to the processing conditions and the total costs for the seat valve.

The valve is advantageously designed as an installation valve, which is inserted into an installation bore and is fastened by way of a flange to a fastening surface. Arranged between the fluid ports, firstly between P and TNC and secondly between P and TNO, is in each case a seal which prevents a short circuit through the gap between the installation bore and the valve sleeve.

Here, said seal is advantageously designed as a lip seal. It seals a positive pressure difference between P and TNC or between P and TNO on account of its installation position, but in the case of a negative pressure difference, it allows a small fluid flow to pass between the lip of the seal and the installation bore. If this happens infrequently and at a small pressure difference, this does not compromise the lifetime of the seal.

Seat valves of the type described are used for hydraulic brake systems of vehicles. However, they may also be used in other applications including vehicle gear mechanisms or in hydraulic drives.

Further areas of applicability will become apparent from the description provided herein. The description and specific examples in this summary are intended for purposes of illustration only and are not intended to limit the scope of the present disclosure.

BRIEF DESCRIPTION OF THE DRAWINGS

The drawings described herein are for illustrative purposes only of selected embodiments and not all possible implementations, and are not intended to limit the scope of the present disclosure.

The drawing shows a seat valve according to the disclosure with three ports.

Corresponding reference numerals indicate corresponding parts throughout the several views of the drawings.

DETAILED DESCRIPTION OF THE PREFERRED EMBODIMENT

Example embodiments will now be described more fully with reference to the accompanying drawings.

The seat valve 1, as shown in FIG. 1, is actuated by an electromagnet 2, and has a valve sleeve 12 with at least one sealing seat 5, that has at least one first sealing body 4 connected in a force-fitting manner via a tappet 14 to an armature 10 of the electromagnet 2, and has at least two ports, namely the ports P and TNC, for fluid flows.

In a de-energized state of the electromagnet 2, a fluid flow from P to TNC occurs only if the pressure difference between the ports P and TNC exceeds a limit value of $\Delta p_G$.

In this case, the force of the specified pressure difference overcomes the force of a spring 11 and therefore the first sealing body 4 is pushed out of a first sealing seat 5.

In an energized state of the electromagnet 2, a fluid flow from P to TNC occurs even in the case of a pressure difference less than $\Delta p_G$, because the force of the electromagnet 2 overcomes the force of the spring 11, wherein the first sealing body 4 is pushed out of the first sealing seat 5.

Advantageously, the seat valve 1 has a further port TNO which, in the de-energized state of the electromagnet 2, is fluidically connected to the port P but, if the sum of all the forces on a second sealing body 6 pushes said body into a second sealing seat 7, is not fluidically connected to the port P. In this case, the following forces have a closing action or an opening action on the sealing body:

the force of the electromagnet 2, closing,
the force of the spring 11, opening,
the force of the pressure difference between P and TNO, opening,
the force of the pressure difference between P and TNC, closing.

Furthermore advantageously, owing to the ability of an electrical controller, connected to the electromagnet, to generate different currents, the armature 10 of the electromagnet 2 is able to assume three working positions counter to the force of the spring 11, namely a rest position, when energization occurs with less current than I1, wherein the connection of the ports P and TNO is always open, and the connection of the ports P and TNC is opened only if the pressure difference between the ports P and TNC is greater than the limit value $\Delta p_G$, an intermediate position, when energization occurs with more current than I1 and less current than I2, wherein the port P is connected both to the port TNO and to the port TNC because the two sealing bodies 4, 6 do not bear on their sealing seats 5, 7, an end position, when energization occurs with more current than I2, wherein the port P is connected only to the port TNC because the sealing body 6 bears on its sealing seat 7 and the sealing body 4 is lifted off from its sealing seat 5.

Here, for example, the current I1 is 1.2 A and the current I2 is 1.5 A, and at 1.2 A, the force of the electromagnet 2 is sufficient to lift the sealing body 4 off from its sealing seat 5, but the force is not yet sufficient to push the spring 11 further in and to push the sealing body 6 into its sealing seat 7.

Preferably, the closure of the specified fluidic connections is in each case realized by the placement of a first or a second sealing body 4, 6 against a first or a second sealing seat 5, 7, wherein the sealing bodies 4, 6 are produced from a plastic which is selected from the group (PEEK, PEI, PESU and LCP).

The said materials are all suitable for this application, and they are selected according to their processability and the total costs.

Advantageously, between the ports P and TNC, a first static seal 8, which is produced from an elastomer material and which is designed as a lip seal, is arranged in an outer groove of the valve sleeve 12. The lip of said seal bears against an installation bore 13 when the seal seals off. If the pressure at the port TNC exceeds the pressure at the port P, the seal 8 loses its sealing function because the pressure difference lifts the lip of the seal off from the installation bore, and a fluid flow from the port TNC to the port P is opened up.

Likewise advantageously, also between the ports P and TNO, a second static seal 9, which is produced from an elastomer material and which is designed as a lip seal, is arranged in an outer groove of the valve sleeve 12. The lip of said seal bears against the installation bore 13 when the seal seals off. If the pressure at the port TNO exceeds the pressure at the port P, the seal 9 loses its sealing function because the pressure difference lifts the lip of the seal off from the installation bore, and a fluid flow from the port TNO to the port P is opened up.

LIST OF REFERENCE SIGNS

1. Seat valve
2. Electromagnet
4. First sealing body
5. First sealing seat
6. Second sealing body
7. Second sealing seat
8. Seal
9. Seal
10. Armature
11. Spring
12. Valve sleeve
13. Installation bore
14. Tappet
P Port for fluid flow to the brake cylinder TNO Port for fluid flow to the consumer
TNC Port for fluid flow to the pressure accumulator
I1 Lower limit value for the electric current
I2 Upper limit value for the electric current
$\Delta p_G$ Limit value for the pressure difference The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A seat valve actuated by an electromagnet has a valve sleeve with at least one first sealing seat, has at least one first sealing body connected in a force-fitting manner to an armature of the electromagnet, and has at least two ports, the at least two ports includes port (P) and port (TNC), for fluid flows,
wherein,
in a de-energized state of the electromagnet, a fluid flow from the port (P) to the port (TNC) occurs only if a pressure difference between the port (P) and the port (TNC) exceeds a limit value ($\Delta p_G$), wherein the limit value ($\Delta p_G$) is a first pressure force of the pressure difference between the port (P) and the port (TNC) that overcomes a spring force of a spring and pushes the first sealing body out of the first sealing seat,
and in that in an energized state of the electromagnet, a fluid flow from the port (P) to the port (TNC) occurs even in the case of a pressure difference less than the limit valve ($\Delta p_G$) if an electromagnet force of the electromagnet together with a pressure force of the pressure difference between the port (P) and the port (TNC) overcomes the spring force of the spring, wherein a sum of the electromagnetic force and the pressure force pushes the first sealing body out of the first sealing seat,
and in that no fluid flow from the port (P) to the port (TNC) occurs if the spring force of the spring exceeds a sum of the pressure force of the pressure difference from the port (P) to the port (TNC) and of the electromagnetic force of the electromagnet, because then the first sealing body seals off in its first sealing seat.

2. The seat valve according to claim 1, wherein said seat valve has a further port (TNO) which, in a de-energized state of the electromagnet, is fluidically connected to the port (P) but, if a sum of all the forces on a second sealing body pushes said second sealing body into a second sealing seat, is not fluidically connected to the port (P), wherein the following forces have a closing action or an opening action on the sealing body:
the electromagnetic force of the electromagnet, closing,
the spring force of the spring, opening,
a second pressure force of the pressure difference between the port (P) and the port (TNO), opening,
the pressure force of the pressure difference between the port (P) and the port (TNC), closing.

3. The seat valve according to claim 2, wherein owing to an ability of an electrical controller, connected to the electromagnet, to generate different currents, the armature of the electromagnet is able to assume three working positions counter to the spring force of the spring, namely a rest position, when the electromagnet is energized with less current than a first current (I1), whereby, owing to the spring force of the spring, the connection of the port (P) and the port (TNO) is always open, and the connection of the port (P) and the port (TNC) is opened only by the first pressure force of the pressure difference between the port (P) and the port (TNC), if the specified pressure difference is greater than the limit value ($\Delta p_G$),
an intermediate position, when the electromagnet is energized with more current than the first current (I1) and less current than a second current (I2), in which the electromagnetic force of the electromagnet, the spring force of the spring, and of the pressure difference between the port (P) and the port (TNO) and between the port (P) and the port (TNC) are in equilibrium, wherein the port (P) is connected both to the port (TNO) and to the port (TNC) because the first sealing body and the second sealing body do not bear on their first sealing seat and second sealing seat, respectively, and
an end position, when the electromagnet is energized with more current than (I2), wherein the port (P) is connected only to the port (TNC) but not to the port (TNO) because the second sealing body bears on the second sealing seat while the first sealing body is lifted off from the first sealing seat.

4. The seat valve according to claim 1, wherein a closure of the specified fluidic connections is in each case realized by a placement of the first or the second sealing body against the first or the second sealing seat, wherein the first and second sealing bodies are produced from a plastic which is selected from the group (PEEK, PEI, PESU and LCP).

5. The seat valve according to claim 1, wherein between the port (P) and the port (TNC), a first seal, which is produced from an elastomer material and which is designed as a lip seal, is arranged in an outer groove of the valve sleeve, and a lip of said first seal, when the sealing function of the latter is being applied, bears against an installation bore, wherein, if the pressure at the port (TNC) exceeds the pressure at the port (P), the first seal loses its sealing function and opens up a fluid flow from the port (TNC) to the port (P) because the lip lifts off from the installation bore.

6. The seat valve according to claim 2, wherein between the port (P) and the port (TNO), a second seal, which is produced from an elastomer material and which is designed as a lip seal, is arranged in a second outer groove on the valve sleeve, and a lip of said second seal, when the sealing function is being applied, bears against an installation bore, wherein, if the pressure at the port (TNO) exceeds the pressure at the port (P), the second seal loses its sealing function and opens up a fluid flow from the port (TNO) to the port (P) because the lip lifts off from the installation bore.

7. A seat valve comprising:
an electromagnet having an armature configured to actuate the seat valve;
a valve sleeve body having at least one first sealing seat and at least one first sealing body connected to the armature;
a first port (P); and
a second port (TNC);
wherein when the electromagnet is de-energized, a fluid flow from the first port (P) to the second port (TNC) occurs if a pressure difference between the first port (P) and the second port (TNC) exceeds a limit value ($\Delta p_G$), wherein the limit value ($\Delta p_G$) is a limit value pressure difference force of the pressure difference between the port (P) and the port (TNC) that overcomes a spring force of a spring biasing the first sealing body out of the first sealing seat;

wherein when the electromagnet is energized, a fluid flow from the first port (P) to the second port (TNC) occurs even if the pressure difference is less than the limit value ($\Delta p_G$) if an electromagnetic force of the electromagnet together with a pressure difference force of the pressure difference between the first port (P) and the second port (TNC) overcomes the spring force of the spring, wherein a sum of the electromagnet force and the pressure difference force pushes the first sealing body out of the first sealing seat; and wherein no fluid flow occurs from the first port (P) to the second port (TNC) if the spring force of the spring exceeds a sum of the pressure difference force and the electromagnetic force because the first sealing body seals off the first sealing seat.

\* \* \* \* \*